United States Patent

Kokubu

[11] Patent Number: 5,555,863
[45] Date of Patent: Sep. 17, 1996

[54] AUTOMOBILE ENGINE STARTER

[75] Inventor: Sadao Kokubu, Aichi, Japan

[73] Assignee: Kabushiki Kaisha Tokai Rika Denki Seisakusho, Aichi, Japan

[21] Appl. No.: 356,957

[22] Filed: Dec. 16, 1994

[30] Foreign Application Priority Data

Dec. 17, 1993 [JP] Japan .................................. 5-317932

[51] Int. Cl.$^6$ .............................. B60R 25/04; F02N 11/08
[52] U.S. Cl. ........................................ 123/179.3; 307/10.3
[58] Field of Search .............................. 123/179.2, 179.3, 123/179.4, 146.5 B, 198 B; 307/10.3, 10.4, 10.5; 180/167, 287

[56] References Cited

U.S. PATENT DOCUMENTS

| 4,733,638 | 3/1988 | Anderson | 123/198 B |
| 4,868,409 | 9/1989 | Tanaka et al. | 307/10.5 |
| 4,965,460 | 10/1990 | Tanaka et al. | 307/10.3 |

FOREIGN PATENT DOCUMENTS

| 0355475 | 2/1990 | European Pat. Off. . |
| 0525730 | 3/1993 | European Pat. Off. . |

OTHER PUBLICATIONS

Milt Leonard, "Rf Transponder Embedded in Auto Ignition Keys Stymies Car Thieves," Electronid Design, vol. 41, No. 25, Dec. 2, 1993, pp. 35–36.

Primary Examiner—Andrew M. Dolinar
Attorney, Agent, or Firm—Finnegan, Henderson, Farabow, Garrett & Dunner, L.L.P.

[57] ABSTRACT

A remote-control key for use in a remote-control system is provided with a transmission circuit in a key grip and used for transmitting an atmospheric propagation signal as an locking or unlocking signal containing an ID code. When the key is inserted into an IG key cylinder and detected by an IG key position switch, a control unit on the automobile side is adapted to accepting the atmospheric propagation signal received via an antenna for a predetermined period, verifying the ID code, outputting a signal for effecting an engine-starting operation when the key is proper, and permitting an engine being started. It is thus prevented to start the engine unlawfully with a mechanically-copied key.

2 Claims, 4 Drawing Sheets

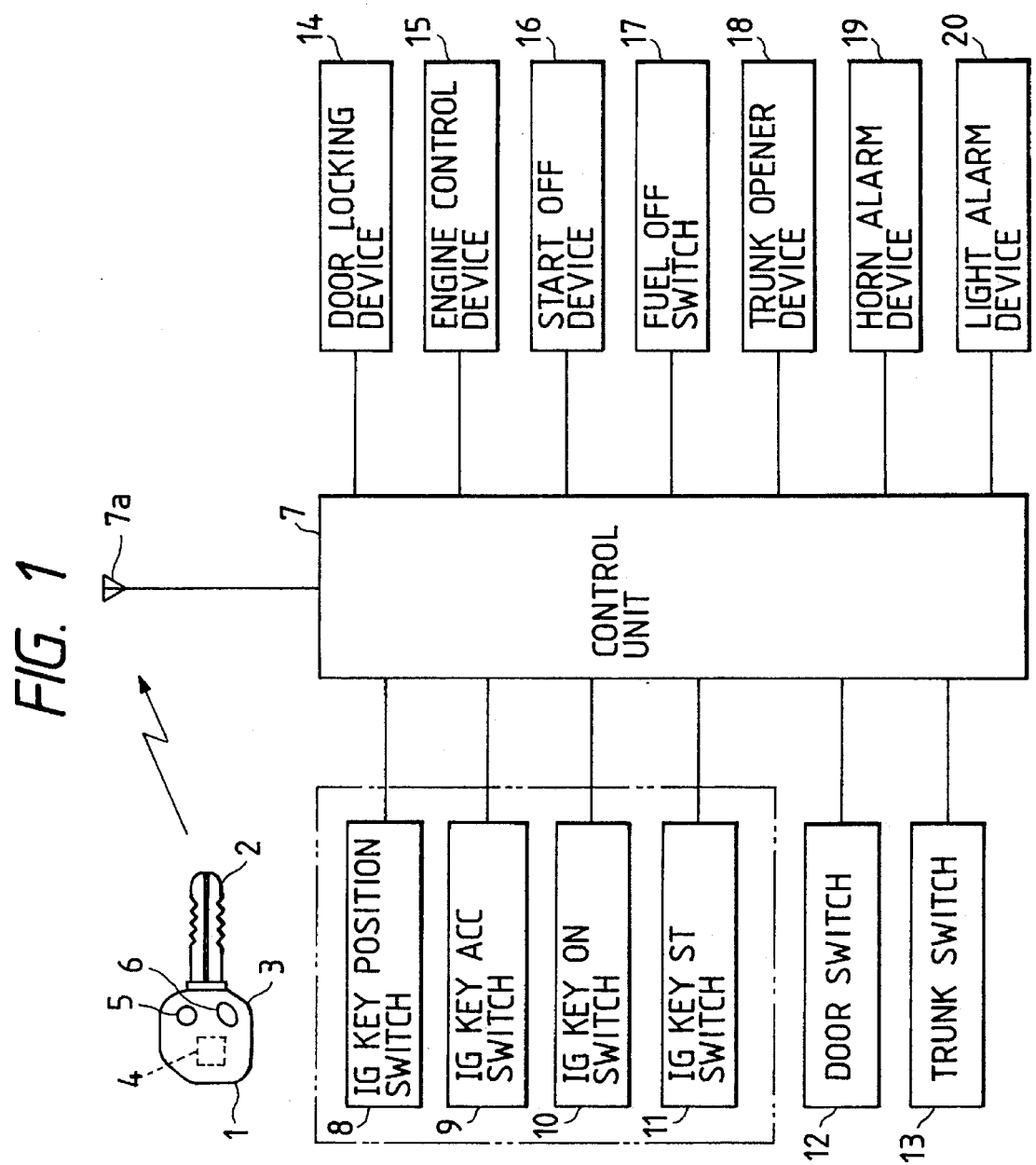

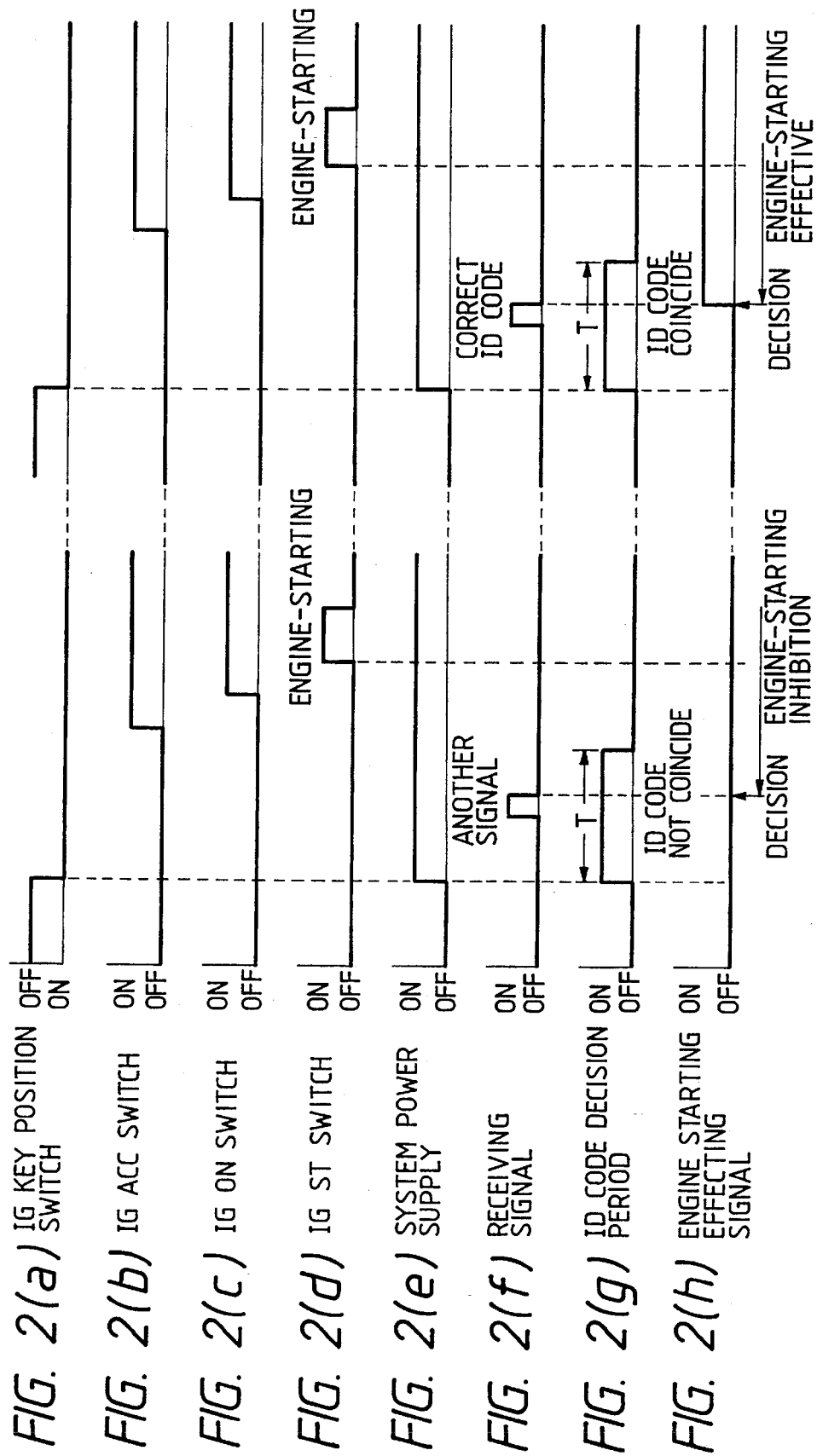

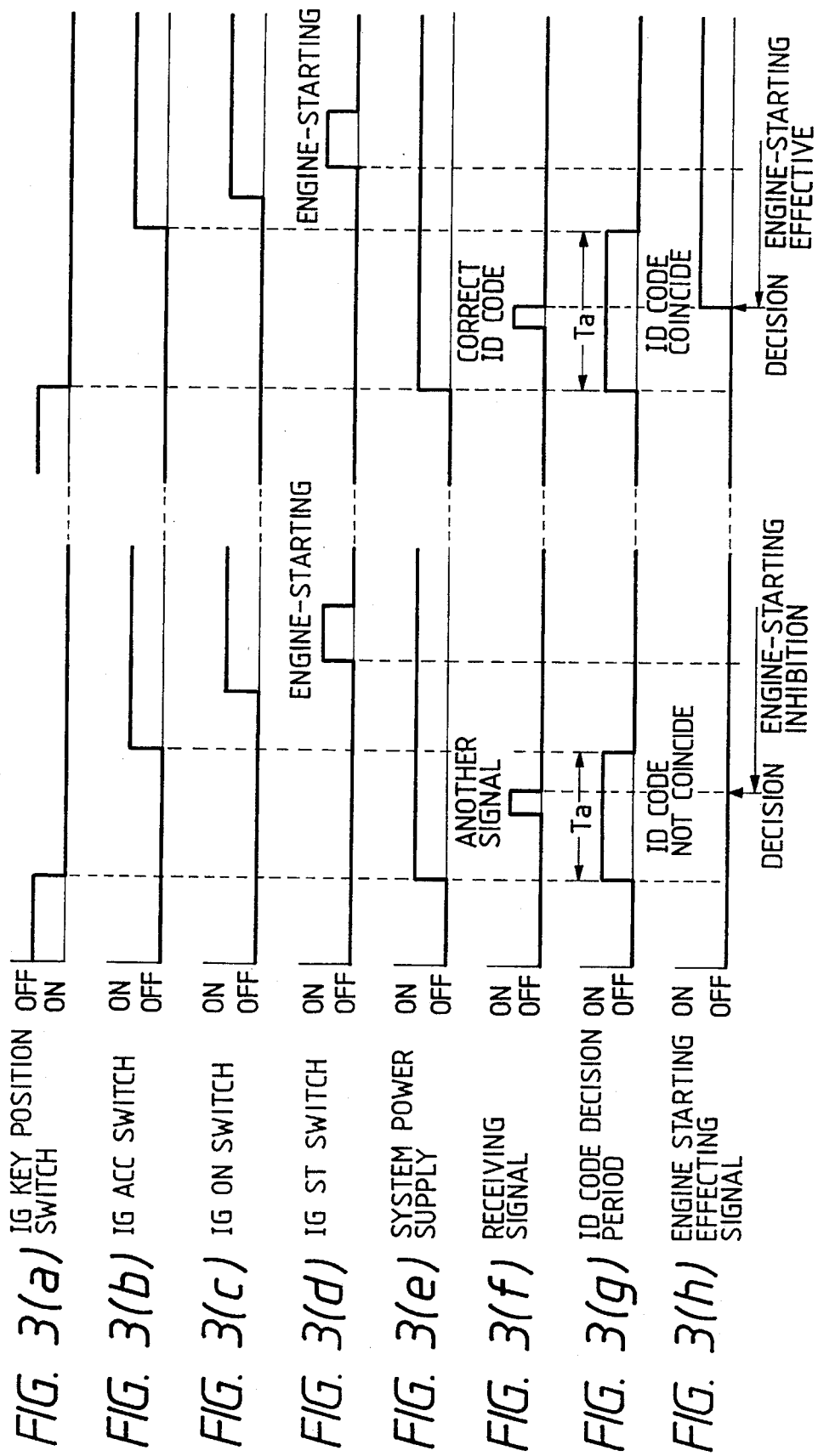

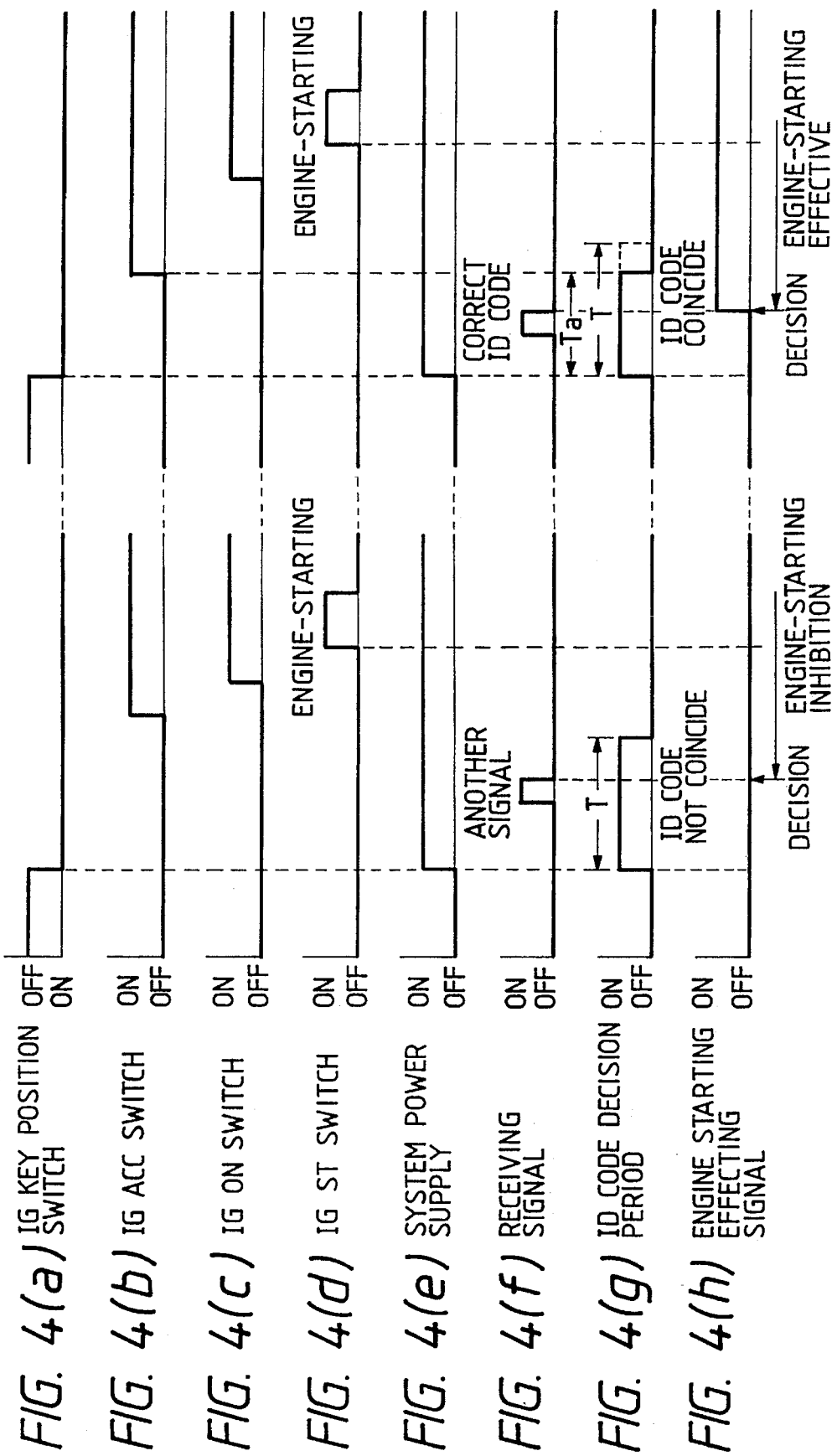

AUTOMOBILE ENGINE STARTER

This application is related to copending application Ser. No. 08/296,894, filed Aug. 29 1994.

BACKGROUND OF THE INVENTION

1. Field of the Invention

The present invention relates to an automobile engine starter for preventing an automobile engine from being started by a wrong key.

2. Related Art

An automobile engine starter of the sort stated above is designed to check a key inserted into an ignition key cylinder to see if it is a right key so as to justify the attempt to start the engine when it is the right one or vitiate the attempt when it is a wrong one, and further to perform the operation of informing those around an automobile of an unlawful act being committed by issuing warning, for example.

In order to decide whether the key inserted in the ignition key cylinder is right or wrong in that case, there is a known arrangement in which the key plate of a key is furnished with a resistor having a specific resistance, whereas an ignition key cylinder is fitted with a detector or the like for reading the resistance of the resistor provided therein when the key is inserted.

Another arrangement that has been proposed is to provide a resonance circuit having a specific frequency in the key grip of a key so that resonance may occur at the specific frequency, and a detecting device for reading the resonance frequency of the resonance circuit of the key.

A resistance and a resonance frequency are respectively set in the resistor and the resonance circuit on the key side as a physical quantity proper to an automobile, whereas the device for detecting the physical quantity is installed on the ignition key cylinder side in the manner mentioned above, whereby the key in question is decided to be a right one by detecting and verifying the physical quantity proper to the automobile.

However, the aforementioned conventional arrangements have been found unacceptable in respect to the following points:

In the case where the resistor is planted in the key plate, there are only about 20 kinds of resistors at the most in which any identifiable resistances in the range of given resistances fit for detection may be set. In order to detect the resistance of such a resistor, it is necessary to provide a key plate with a contact which is allowed to electrically make contact with the ignition key cylinder side. The problem in this case is that periodic maintenance is required to deal with, for example, the frictional wear and contact failure of the contact.

In the case where, with the resonance circuit provided for the key grip, its resonance frequency is detected on the ignition key cylinder side, only several tens of frequencies at the most may be put to practical use as identifiable frequencies in the range of given frequencies.

In other words, the total number of physical quantities that can be set is restricted in the conventional arrangements above in which, by setting a discrete physical quantity such as the resistance, the resonance frequency or the like on the key side, the physical quantity is examined and verified on the ignition key cylinder side. It is therefore hardly possible to improve security. If it is conversely attempted to improve security, there will arise the necessity of setting a highly-precise physical quantity and a device for detecting it. This is also disadvantageous in that additional cost may be incurred.

SUMMARY OF THE INVENTION

In view of the foregoing problems, an object of the present invention is to provide an automobile engine starter capable of improving not only security by making it possible to set a number of identification codes for letting the key side correspond to the ignition key cylinder side without restriction but also maintenance while the identification code is transmitted and received therebetween in an electrically non-contact state.

According to an aspect of the present invention, an automobile engine starter comprises transmission means for transmitting an atmospheric propagation signal a containing identification code when operating switches provided for a key are activated, reception means for receiving the atmospheric propagation signal, the reception means being provided on a car body side, key detecting means for detecting the insertion of the key into an ignition key cylinder, the key detecting means being provided for the ignition key cylinder, and control means for outputting a signal for effecting the operation of starting an automobile engine on condition that the identification code contained in the atmospheric propagation signal conforms to a prestored identification code when the atmospheric propagation signal transmitted from the transmission means is received by the reception means until at least one of the following periods of time elapses: namely, the period from a point of time a detection signal for detecting the insertion of the key is received from the key detecting means up to input allowable time within a preset time length; and the period from the point of time the detection signal therefor is received therefrom up to the time the key is turned.

The automobile engine starter according to the present invention causes the key detecting means to detect the insertion of the key into the ignition key cylinder, and in this state the control means waits for the identification code contained in the atmospheric propagation signal received by the reception means during at least one of the following periods: namely, the period from a point of time a detection signal for detecting the insertion of the key is received from the key detecting means up to input allowable time within a preset time length; and the period from the point of time the detection signal therefor is received therefrom up to the time the key is turned. When the atmospheric propagation signal, containing the identification code, is transmitted from the reception means as the result of the operation performed by a user, the control means compares the identification code received from the reception means with what has been allocated to itself and outputs the signal for effecting an engine-starting operation provided both conform to each other. When the ignition key cylinder detects the ON- or start-position, after the key is turned, the engine is started.

In the above case, the period during which the control means waits for the identification code contained in the atmospheric propagation signal from the reception means may be limited to the input allowable period of time above, or the period from the point of time the detection signal is received up to the time the key is turned; otherwise, both the periods may be set.

If the identification code received from the reception means is not identified in that state, on the other hand, the control means will not output the signal for effecting the engine-starting operation nor allow the engine to start even though the ON- or start-position is detected after the key is turned.

In case a foul key whose key, plate is simply a mechanical copy of the original, is introduced into an ignition key cylinder, for example, the identification code will not be input and a signal for effecting the engine-starting operation will not be output. Even when the door is opened with the foul key, the engine is prevented from starting to ensure that the automobile is not stolen.

BRIEF DESCRIPTION OF THE DRAWINGS

FIG. 1 is showing a schematic block diagram of an electrical arrangement embodying the present invention;

FIGS. 2(a) to (h) are time charts showing a state in which a signal is output from each device;

FIGS. 3(a) to (h) are time charts with reference to a second embodiment of the present invention; and FIG. 4(a) to (h) are time charts with reference to a third embodiment of the present invention.

DETAILED DESCRIPTION OF THE PREFERRED EMBODIMENTS

Referring to FIGS. 1 and 2, a description will subsequently be given of a first embodiment of the present invention in which a system for locking and unlocking a door by means of a remote-control key is applied to an automobile.

FIG. 1 is a schematic block diagram of an electrical arrangement, wherein a remote-control key 1 is formed of a key plate 2 and a key grip 3 having a built-in transmission circuit 4. Further, the key grip 3 is provided with a locking switch 5 and an unlocking switch 6 as operating switches. When these switches are depressed, a locking signal or an unlocking signal containing the ID code as an identification code is transmitted from the transmission circuit 4 as an atmospheric propagation signal.

In this case, the ID code is in the form of a 20-bit binary digital signal, for example, and an ID code is set proper to each automobile. Further, digital data on the ID code is stored in the transmission circuit 4 and the same ID code is set on the automobile side so as to distinguish its own code from another one.

A control unit 7 used as a control means normally contains a microcomputer, and stores not only control programs but also the same ID code as what has been set in the remote-control key 1. The control unit 7 operates to receive an atmospheric propagation signal by means of an antenna 7a used as a reception means. An IG key position switch 8 used as a means for detecting the insertion of the key plate 2 of the remote-control key 1, is provided in an ignition key cylinder (not shown) which is located in front of the driver's seat. A key-detection signal is thus applied to the control unit 7.

When the right key plate 2 is inserted, the ignition key cylinder is adapted to allow the key plate 2 to be turned from the OFF position to the ACC (accessory), ON and ST (start) positions. When the key plate 2 is turned to any one of the positions, an IG key ACC switch 9, an IG key ON switch 10 and an IG key ST switch 11, respectively detect the key plate 2 and input the signal detected by the control unit 7.

Moreover, a door switch 12 for detecting the operation of opening and closing the door of the automobile and a trunk switch 13 for detecting the operation of opening and closing the trunk are connected to the control unit 7, whereby the detected signal is applied thereto.

A door locking device 14 is used for receiving the locking or unlocking signal from the control unit 7, and driving a door locking mechanism (not shown) so as to cause it to perform the locking or unlocking operation according to the control signals. An engine control device 15 is connected to the control unit 7 and performs the operation of controlling fuel injection in the engine when a signal for effecting the engine-starting operation is given. A start OFF device 16 and a fuel OFF switch 17 are also connected to the control unit 7 and when the signal for effecting the engine-starting operation is given, permit the operation of starting the starter and that of supplying fuel to be performed, respectively.

Further, a trunk opener device 18, a horn alarm device 19 and a light alarm device 20 are connected to the control unit 7. The trunk opener device 18 is used for electrically driving a mechanism for opening the trunk according to a control signal given by the control unit 7. The horn alarm device 19 is used for sounding an automobile horn (not shown) according to an alarm signal given by the control unit 7 to effect the alarm operation. The light alarm device 20 is used for flashing on and off automobile lights (not shown) according to the alarm signal given by the control unit 7 to effect the alarm operation.

The operation of the starter in the present embodiment of the invention will subsequently be described.

First, a description will be given of the operation of locking and unlocking the remote-control door using the remote-control key 1. In other words, the locking or unlocking signal as an atmospheric propagation signal is output by the transmission circuit 4 in the key grip when the locking switch 5 or the unlocking switch 6 of the remote-control key 1 is depressed at some distance apart from an automobile.

The atmospheric propagation signal is received via the antenna 7a by the control unit 7 on the automobile side. When the ID code contained in the signal received is right, the control unit 7 applies a locking or unlocking control signal to the door locking device 14 in according with the then locking or unlocking signal and the door locking device 14 thereby causes the door locking mechanism to perform the locking or unlocking operation.

In a case where the remote door locking operation is performed by means of the remote-control key 1, the control unit 7 sets an alarm mode in which an antitheft function is effected when it detects that measures have been taken to park the automobile.

More specifically, these measures thus taken include having all the doors, the trunk and the engine hood of the automobile closed, turning off its engine, and pulling the key out of the ignition key cylinder. The control unit 7 determines the standstill condition according to the signals detected from the door switch 12, the trunk switch 13 and the IG key position switch 8.

When the control unit 7 receives the locking signal containing the right ID code from the remote-control key 1 in such a state that the parking steps have been taken, it applies the door locking control signal to the door locking device 14 as mentioned above, thus causing the device to perform the locking operation so as to set the alarm mode. The control unit 7 issues the alarm signal to the horn alarm device 19, the light alarm device 20 and the like when an unlawful act occurs according to the signals detected from the various switches when keys are inserted into the door cylinder and the ignition key cylinder and turned with the intention of committing a theft, except for a case where the unlocking key containing the right ID code is received from the remote-control key 1.

In this manner, the horn alarm device 19 is sounded and the light alarm device 20 is caused to flash on and off the headlights to call attention of those around the automobile to the alarm operation. Therefore, any intruder is thus made to give up the idea of committing an unlawful act.

Moreover, the remote-control key 1 also has an extended function to render the trunk openable under remote control. This function is implemented by, for example, depressing the unlocking switch 6 of the remote-control key 1 for a predetermined time (e.g., two seconds). Consequently, the control unit 7 bases it on the fact that the signal received via the antenna 7a contains the right ID code and that the signal is continuously input for over a predetermined time output (not the unlocking control signal, but the control signal) to the trunk opener device 18. Then the trunk opener device 18 drives the door-opening mechanism to open the trunk.

Referring to the time chart of FIG. 2, a description will be given of the operation of starting an engine by inserting the key 1 into the ignition key cylinder.

When the key plate 2 of the remote-control key 1 is inserted into the ignition key cylinder, a key detection signal at an "L" level is output by the IG key position switch 8 as shown in FIG. 2(a), whereby power is supplied from a system power supply to each device (see FIG. 2(e)).

The control unit 7 in this state stands ready for making the antenna 7a receive the atmospheric propagation signal transmitted from the remote-control key 1 for only an allowable input period of time having a preset time length, that is, for an ID code decision period T (e.g., 10 sec) (see FIG. 2(g)). When such an atmospheric propagation signal is received by the antenna 7a during the decision-making period (see FIG. 2(f)), the control unit 7 reads the ID code contained in the atmospheric propagation signal and decides whether the ID code is right or wrong.

In this case, the control unit 7 applies the signal for effecting the engine-starting operation to the engine control device 15, the start OFF device 16 and the fuel OFF switch 17 when the ID code received conforms to its own ID code stored inside (see the right side of FIG. 2(h)). As a result, the start OFF device 16 effects the engine-starting operation, whereas the fuel OFF switch 17 effects the operation of supplying fuel to the engine.

When the ID code received does not conform to its own ID code stored inside, the control unit 7 understands that the right remote-control key 1 has not been inserted into the ignition key cylinder and does not apply the signal for effecting the engine-starting operation to the engine control device 15, the start OFF device 16 and the fuel OFF switch 17 (see the left side of FIG. 2(h)). Therefore, the engine refrain from starting.

The detection of the ACC position (see FIG. 2(b)) by the IG key ACC switch 9 after the ignition key cylinder is rotated signifies that the key thus inserted has mechanically coincided with the right key plate 2 of the remote-control key 1. When the IG key ON switch 10 and the IG key ST switch 11 detect the ON and ST positions subsequently and successively (see FIGS. 2(c), (d)), the engine control device 15 will start the engine if supplied with the signal for effecting the engine-starting operation and will not start engine if not supplied.

When the ID code is input after the decision-making period T has elapsed in the above case, the control unit 7 has been so arranged as to refrain from performing the decision-making operation even though the ID code is valid. Consequently, the engine is prevented from being started on condition that the decision-making period has elapsed even when any unauthorized third person unlawfully using the remote-control key 1 without knowing the operating procedure has come to perceive the procedure through trial and error.

According to the present embodiment of the invention, the ID code decision period T is provided as a predetermined period of time after the remote-control key 1 is inserted into the ignition key cylinder and the signal for effecting the engine-starting operation is output when the right ID code is received by the control unit 7 during that period. Consequently, no arrangements are required for electrically detecting and verifying physical quantities such as the resistance of a resistor or the resonance frequency of a resonance circuit to prevent an engine from starting by means of a duplicate key prepared by mechanically copying the key plate 2. It is therefore possible to set a specific ID code proper to each automobile using a multibit digital signal such as an ID code and to perform the identifying operation in the non-contact state. The antitheft effect is thus improved, whereas mechanical maintenance due to contact failure and the like is unnecessitated.

According to the present embodiment of the invention, moreover, the identification code can be transmitted and received without separately providing any special arrangements on the ignition key cylinder and key sides by employing the transmission circuit 4 installed in the key grip 3 of the remote-control key 1 in the remote-control key system as the means for transmitting the identification code in the form of an atmospheric propagation signal, and utilizing the identification code contained in the locking or unlocking signal transmitted thereby. Consequently, the remote-control system can be made less costly.

According to the present embodiment of the invention, further, the control unit 7 makes the ID code decision period T a period during which the ID code is accepted after the key has been detected by the IG key position switch 8, and outputs the signal for effecting the engine-starting operation only when the right ID code is received during that period. Therefore, improvement in the antitheft effect is enhanced since the engine is prevented from starting after the lapse of the decision-making period even when third person performing the unlocking operation using the right remote-control key 1 without knowing the operating procedure succeeds in following the proper procedure through trial and error, for example.

FIG. 3 is a time chart with reference to a second embodiment of the present invention, wherein what makes this embodiment different from the first one is that a decision-making period Ta from the detection of a key by the IG key position switch 8 up to that of the ACC position by the IG key ACC switch is set instead of securing the ID code decision period set by the control unit 7 for the predetermined period T. In other words, the control unit 7 is adapted to accept the entry of an ID code until a user turns the key after inserting it into the ignition key cylinder (see FIG. 3(g)).

It is therefore only necessary for the user to follow the procedure required before he/she turns the key regardless of the operating speed of the remote-control key 1. Consequently, individual operating variation can flexibly be dealt with. Even when a user desires to start an engine quickly, the engine can be started by turning a key immediately after the signal for effecting the engine-starting operation is output. Except for the point noted above, the second embodiment of the present invention has substantially the same effect as that of the first embodiment.

FIG. 4 is a time chart with reference to a third embodiment of the present invention, wherein what makes this embodiment different from the first one is that while the identification code decision period set by the control unit 7 is secured for the predetermined period T, the former is terminated at a point of time the IG key ACC switch detects the ACC position.

Thus, as shown in FIG. 4(b), for example, an actual decision-making period varies from a case where the key plate 2 of the remote-control key 1 is turned after a period of time T1 (T1>T) longer than the decision-making period T has elapsed since the key was inserted into the ignition key cylinder to a case where the key plate 2 of the remote-control key 1 is turned after a period of time T2 (T2<T) shorter than the decision-making period T has elapsed since then.

Therefore, the third embodiment of the present invention has substantially the same effect as that of the first embodiment as well. The above arrangements in connection with the setting of the decision-making period simultaneously having the features of the first and second embodiments contribute to making not only the engine starter user-friendly but also the antitheft effect improvable.

A description has been given of cases where the present invention is applied to the remote-control key system in the embodiments thereof. However, the present invention is not limited to the embodiments above but applicable to an arrangement in which the key may be supplied with a separate transmission means.

Although a description has also been given of cases where the remote-control key 1 is provided with the locking and unlocking switches 5, 6 as operating means in the embodiments above, the present invention is not limited to such cases but applicable to another arrangement in which, by causing one switch to transmit one and the same atmospheric propagation signal, locking and unlocking operations are alternately performed on the automobile side.

The automobile engine starter according to the present invention is provided with the control means for outputting the signal for effecting the operation of starting the automobile engine on condition that the identification code contained in the atmospheric propagation signal conforms to the prestored identification code when the atmospheric propagation signal transmitted from the transmission means is received by the reception means during at least one of the following periods: namely, the period from the point of time the detection signal for detecting the insertion of the key is received from the key detecting means up to the input allowable time within the preset time length; and the period from the point of time the detection signal therefor is received therefrom up to the time the key is turned. When the identification codes do not conform to each other, the control unit 7 will not therefore output the signal for effecting the operation of starting the automobile engine and even when the ON or start position is detected by the ignition key cylinder after the key is turned, the engine can be prohibited from being started.

In case a foul key whose key plate is simply a mechanical copy of the original is introduced into the ignition key cylinder, for example, the identification code is not be input and the signal for effecting the engine-starting operation is not also be output. Even when the door is opened by any wrong-doer with the foul key and when the operation of turning the ignition key cylinder is performed, the engine is kept in such a state that it is prohibited from starting to ensure that the automobile is prevented from being stolen by taking the wheel. Thus the antitheft effect is greatly improved.

As set forth above, the control means may be adapted for use in limiting the period during which the reception of the identification code contained in the atmospheric propagation signal from the reception means is waited for to only the input allowable time or setting the period to the time interval required until the key is turned or what is required until either period elapses.

What is claimed is:

1. An engine starter system for an automobile having a body with a side, an ignition key cylinder, and an engine, the engine starter system comprising:

a key having a transmission means for transmitting an atmospheric propagation signal containing an identification code;

reception means for receiving the atmospheric propagation signal, the reception means being provided on the body side of the automobile;

key detecting means for detecting the insertion of the key into the ignition key cylinder of the automobile, the key detecting means being provided in the ignition key cylinder; and control means for outputting a signal for effecting the starting of the engine of the automobile on a first condition that the identification code contained in the atmospheric propagation signal matches a prestored identification code in the control means, and further on a second condition that the atmospheric propagation signal is received by the reception means before the key is turned in the key cylinder and within a predetermined time period after a key insertion detection signal is received by the control means from the key detecting means, when the predetermined time period expires and the atmospheric propagation signal has not been received by the reception means, the control means prevents the starting of the engine regardless of a match of the identification code contained in the atmospheric propagation signal with the prestored identification code in the control means.

2. The automobile engine starter system of claim 1, wherein the predetermined time period is 10 seconds.

\* \* \* \* \*